3,152,082
FERROMAGNETIC STRUCTURE AND METHOD FOR PREPARING SAME
William J. Davis, Wyomissing, and Richard C. Gilles, West Lawn, Pa., assignors, by mesne assignments, to Polymer Processes, Inc., Reading, Pa., a corporation of Pennsylvania
No Drawing. Filed Apr. 15, 1960, Ser. No. 22,419
2 Claims. (Cl. 252—62.5)

This invention relates to the preparation of articles of filled polytetrafluoroethylene and is particularly concerned with techniques for preparing filled polytetrafluoroethylene articles with certain unusual electrical properties displaying a high degree of thermal stability.

Polytetrafluoroethylene possesses desirable mechanical and electrical properties, including high mechanical strength, toughness, and high dielectric and electrical voltage breakdown strength that makes it valuable for many special purposes. This resin is particularly advantageous when employed with finely divided ferromagnetic material for use in electric equipment and high frequency applications.

In copending applications Serial No. 495,456, filed March 21, 1955, now abandoned, Serial No. 685,803, filed September 24, 1957, now abandoned, and Serial No. 685,850, filed September 24, 1957, now abandoned, there are described processes for the preparation of articles comprised of highly filled polytetrafluoroethylene. Quite generally, these previous processes describe means for dispersing magnetic materials, such as carbonyl iron, with a finely divided form of polytetrafluoroethylene, removing the liquid slurrying ingredient, compressing the dry powder into desired shapes and forms, and sintering the resultant product into useful structural forms.

The polytetrafluoroethylene used in these processes must be of a fine particle size or dispersion to be useful in this invention. For example, the so-called dispersion form of this resin is characterized by a molecular weight much less than that of the granular form and probably of the order of about 500,000, and also by an ultimate particle size of less than 2 microns. Preferably the average size is only a minor fraction of one micron, for instance, of the order of 0.15 micron. These particles are of colloidal character and in one commercially available form, polytetrafluoroethylene of this kind is suspended in water, comprised of an aqueous dispersion or suspensoid, containing, for example, from about 50 percent to about 65 percent of polytetrafluoroethylene. The colloidal particles of such a resin may be precipitated or coagulated by known treatment of the suspensoid to yield, when dried, a somewhat pasty powder; and the fine particle form of polytetrafluoroethylene is commercially available in this form also.

The filler materials added to the polytetrafluoroethylene, and more particularly the preferred carbonyl iron particles, should be comprised of particles of relatively small size, less than 20 microns, and even down to a small fraction of one micron. When carbonyl iron is in this form the fine particles have extensive surface area and are therefore highly sensitive to oxidation and other degrading influences. For example, exposure of the extensive surface area of carbonyl iron in this form to water or moisture adversely influences the iron and its magnetic properties as does exposure to even slightly elevated temperatures in the presence of atmospheric oxygen.

With the foregoing in mind, the present invention provides special techniques for the preparation of carbonyl iron-filled polytetrafluoroethylene, which techniques avoid adverse influences of oxidation of the carbonyl iron and provide for the production of iron-filled compositions and articles made therefrom of exceptional magnetic, electrical and high temperature strength characteristics.

Commonly, molding powders from which these articles may be formed are prepared by slurrying the precipitated dispersion form of polytetrafluoroethylene powder in a volatile organic liquid wetter capable of wetting polytetrafluoroethylene, such as naphtha, acetone, alcohol, or methyl ethyl ketone. Finely divided particles of inert filling material (which may be magnetic and preferably are carbonyl iron) are also mixed into the slurry. The wetter is then evaporated, either by heating the mixture or by vacuum extraction. In any case, the temperature is kept below 627° F., the fusion temperature of the polytetrafluoroethylene. The molding powder resulting from this procedure is very intimately mixed and is then formed into a flexible article having appreciable green (unsintered) strength. The formation into the suitable shape is more readily accomplished by the use of a small amount of liquid lubricant which is capable of wetting the polytetrafluoroethylene. Suitable lubricants are naphtha or a light grade of petroleum oil such as is used as dielectric insulating oil in electrical apparatus. The material then may be mixed and worked, calendered into sheets or extruded to form an elongated flexible shape, or otherwise formed into a desired shape under pressure.

To gain added strength to the green (unsintered) article so formed, the shape is sintered at or above the fusion temperature of the polytetrafluoroethylene in order to cause at least a partial fusion of the polytetrafluoroethylene particles and a resulting increase in strength and stiffness of the article. As it is desirable to remove the lubricant during the sintering operation, a volatile lubricant such as naphtha or acetone should be used.

Due to the highly pyrophoric nature of certain filler materials such as carbonyl iron, great care must be taken in the sintering process to prevent oxidation of the filler material. To some extent, the oxidation of the filler material may be retarded by coating the filler particles with certain materials such as phosphoric acid. Additionally, it has been essential in the prior art to conduct the sintering process under an inert gas, such as nitrogen, to insure the exclusion of atmospheric oxygen.

It has now been discovered that highly filled polytetrafluoroethylene articles can be prepared containing materials that are readily oxidized and so degraded at sintering temperatures in the presence of the atmosphere without recourse to a blanket of an inert gas.

Accordingly, it is an object of this invention to provide methods for preparing sintered polytetrafluoroethylene articles containing highly oxidizable substances in a manner that does not require them to be sintered in the absence of oxygen.

Another object of this invention is to provide methods for preparing sintered articles comprised of polytetrafluoroethylene and highly oxidizable filler materials in such a manner that the finished articles are highly stable at elevated temperatures.

Yet another object of this invention is to provide methods for preparing sintered articles comprised of polytetrafluoroethylene and magnetic fillers with improved electrical properties.

Briefly the objects of this invention are achieved by incorporating certain electrical grade oils such as silicone-based oils that have high boiling points within the molding material along with certain heat-resistant varnishes such as silicone-based varnishes that can withstand the high sintering temperatures without undergoing excessive degradation. Further, it has been found that air-sintered articles prepared in this manner often display superior electrical properties than do those sintered under a nitrogen blanket by the prior art processes.

The selection of appropriate silicone-based oils and varnishes for use in this process is not too critical so long as they are able to perform their functions at the elevated sintering temperatures. Commercially available materials that have been found to be satisfactory are manufactured by the Dow-Corning Corporation. A suitable oil is Dow-Corning's DC-200 which is a dimethyl silicone-based oil. A suitable varnish is Dow-Corning's 991 which is a heat stable varnish having good dielectric and surface resistive qualities. In the examples given below, these varnishes and oils were used.

In Examples I through IV test samples were prepared by placing 400 grams of previously phosphated carbonyl iron into a blending device. To this was added the silicon-based oil as shown in Table I and 90 cc. of methyl ethyl ketone to serve as a wetting agent. This was then blended for a few minutes. One hundred grams of polytetrafluoroethylene were then added to the mixture along with an additional 110 cc. of methyl ethyl ketone and the mixing operation continued at high speed for another two minutes. After thoroughly mixing this batch, the excess liquid was filtered off in a Buchner funnel. The material was then dried at 150° F. until all of the methyl ethyl ketone was evaporated. The dry filter cake was then broken up and sieved, using a 16 mesh (U.S. Standard) screen.

For extrusion operations, a naphtha lubricating agent was added in an amount about 4 percent by weight of the material. This was then mixed until the lubricant was fully dispersed throughout the powder and the blended material was then placed in a paste extruder to form a rod of 3/16 of an inch in diameter. The rod was then dried at 150° F. until all of the naphtha was driven off and the rod was then coated with the silicone varnish. The rod was then sintered at temperatures of 680° F. for one-half hour under the conditions noted in Table I. A comparison of the quality of the rod produced is shown in Table I.

In Example V material was blended in the same manner as in the above examples using 95 percent by weight iron and 5 percent by weight polytetrafluoroethylene. About 5 percent of the silicone varnish by weight was mixed with the iron and polytetrafluoroethylene mixture and was then pressed in a mold at a pressure of about 25 to 50 tons per square inch. The pressed slug was then soaked in silicone oil over night, during which time approximately 10 to 20 percent by volume of oil was absorbed by the slug. The slug was then placed in a cold oven and brought to a sintering temperature of about 700° F. in a period of about one hour. The slug was left in the oven, exposed to the air, for approximately another hour and then withdrawn.

In Example VI a sintered slug was prepared in a similar manner to that of Example V except that the material was not treated with the silicone oil and varnish. This slug was then sintered under a nitrogen blanket and the comparative properties of the slugs prepared in these two manners are shown in the following Table II.

*Table I*

| Example No. | Percent Silicone Oil Added | Silicone Varnish Applied | Sintering Technique | Magnetic Loss Factor (tan $\delta_m$) | Permeability ($\mu$) |
|---|---|---|---|---|---|
| I | None | None | Nitrogen | 0.00178 | 4.70 |
| II | 5 | None | Nitrogen | 0.00165 | 4.92 |
| III | None | Yes | Air | 0.00151 | 4.86 |
| IV | 3 | Yes | Air | 0.00125 | 5.05 |

*Table II*

| Example No. | Sintering Technique | Magnetic Loss Factor (tan $\delta_m$) | Permeability ($\mu$) | Temperature Rating, °C. |
|---|---|---|---|---|
| V | Air | 0.00196 | 28 | [1] 300 [2] 350 |
| VI | Nitrogen | 0.00200 | 27 | [1] 200 [2] 250 |

[1] Continuous.
[2] Intermittent.

We claim:
1. A ferromagnetic structure having a high degree of thermal stability comprised of a ferromagnetic material held in a synthetic resinous binder, said ferromagnetic material having a particle size of less than 20 microns and being present in an amount from about 80% to about 95% by weight, said resinous binder being comprised of sintered polytetrafluoroethylene having a particle size before sintering of less than about 2 microns and being present in an amount from about 5% to about 20% by weight, characterized in that said structure contains a silicone-based oil dispersed throughout and is treated, at least on its surface, with a silicone-based varnish.

2. Process for the preparation of sintered articles comprised of polytetrafluoroethylene resin and a readily oxidizable filler material comprising the steps of intimately mixing said resin with said filler material in the presence of a silicone-based electric oil, forming a shaped article from such mixture, coating said shaped article with a heat-resistant varnish, and sintering said article.

References Cited in the file of this patent
UNITED STATES PATENTS

| | | |
|---|---|---|
| 1,982,689 | Polydoroff | Dec. 4, 1934 |
| 2,503,947 | Haskew | Apr. 11, 1950 |
| 2,601,212 | Polydoroff | June 17, 1952 |
| 2,644,802 | Lontz | July 7, 1953 |